G. GILES.
ELECTROLYTIC CONDENSER OR ELECTROLYTIC VALVE.
APPLICATION FILED MAR. 11, 1916.
1,190,886.  Patented July 11, 1916.
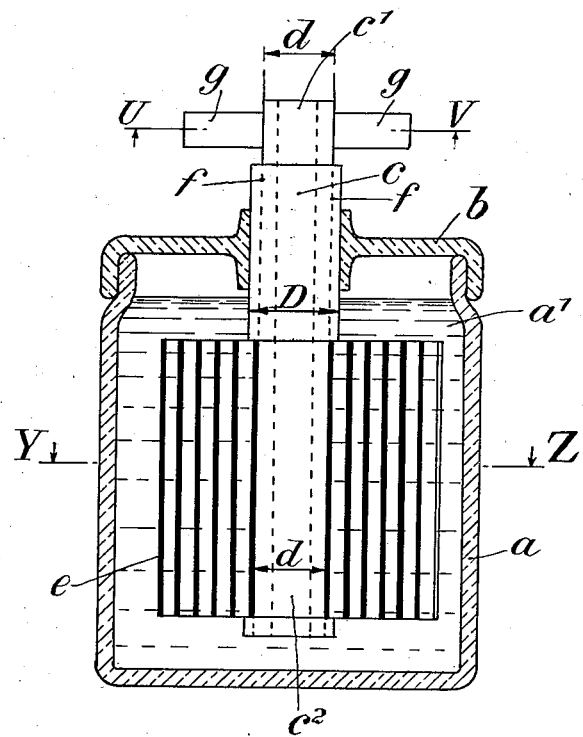
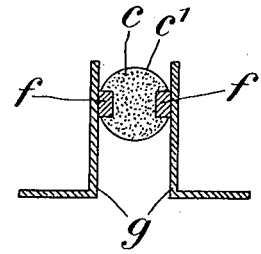
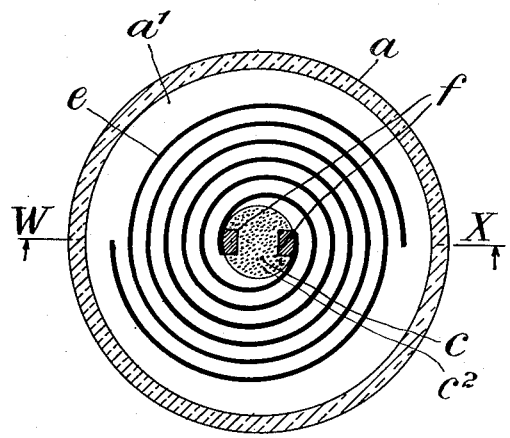
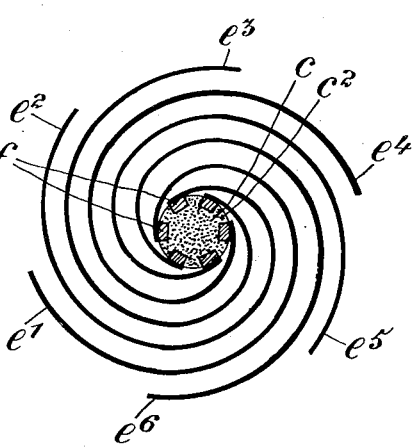
Inventor
Georges Giles
By Serrell & Son
his Attorneys.

UNITED STATES PATENT OFFICE.

GEORGES GILES, OF FRIBOURG, SWITZERLAND.

ELECTROLYTIC CONDENSER OR ELECTROLYTIC VALVE.

1,190,886. Specification of Letters Patent. Patented July 11, 1916.

Application filed March 11, 1916. Serial No. 83,491.

*To all whom it may concern:*

Be it known that I, GEORGES GILES, engineer, a citizen of the United States of North America, residing at Fribourg, Canton of Fribourg, in the Confederation of Switzerland, have invented certain new and useful Improvements in Electrolytic Condensers or Electrolytic Valves, of which the following is a specification.

The present invention relates to electrolytic condensers or valves.

The electrolytic condensers are generally consisting either of two sets of alternating plates or of concentrical cylinders, each set or each cylinder being electrically connected with the one terminal of the apparatus. With the first kind it becomes necessary to connect not only the plates of the one set by means of metallic contacts with each other, but also to maintain the distance between the plates of the two sets by means of intermediate pieces of insulating matter, in order to avoid short circuits between the two poles. This includes the disadvantage that weak points are created at the points of contact of these different pieces in the film-like insulating layer formed on the aluminium. With the second kind this disadvantage is avoided by employing only two concentrical cylinders, but then the effective surface will be a very small one as compared to the space required by the apparatus. If however a great number of cylinders are employed in order to increase the effective surface, it again becomes necessary to establish the contacts between the cylinders corresponding to one and the same pole, whereby the disadvantage mentioned in the above is again brought in.

According to this invention this disadvantage is avoided and a large effective surface is secured by embedding several rods of aluminium within a central axis of insulating matter and by fastening to these rods armatures which are surrounding the axis as bands shaped like circular evolutes wound around it, the upper ends of the aluminium rods serving as connection-contacts for the incoming and the outgoing current.

In the annexed drawing several working examples of the condenser are shown.

Figure 1 is a vertical cross-section through a first form on line W—X of Fig. 2. Fig. 2 is a horizontal cross-section on line Y—Z in Fig. 1. Fig. 3 a cross-section on line U—V in Fig. 1. Fig. 4 a partial view of a second form. Fig. 5 a partial view of a last form.

According to Figs. 1, 2 and 3 the condenser is mounted within a jar containing the electrolyte and covered by a cover $b$. The cylindrical central axis $c$ made for instance of ebonite is crossing this cover. Its diameter is D and two rods of aluminium $f$ are embedded therein. It is provided at its upper end and at its lower half of length with two recessed parts $c^1$, $c^2$ with a diameter $d$ where the rods $f$ are bared. On the lower bared parts of the rods two bands $e$ of aluminium are fastened and are wound around the axis $c$ in shape of circular evolutes with a continuous space between the bands of for instance 3 to 4 mm. Thus a great effective surface requiring but a small space has been created. Owing to the fact, that the sole places of contact are those of the contact of the ends of bands with the rods $f$, the weak points created on the film-like insulating layer of the aluminium will be reduced to a minimum. The bared upper ends of the rods $f$ may be employed for providing there direct contacts $g$ for the incoming or the outcoming current.

If the condenser is employed as lightning arrester within a network of monophase alternating current both bands may be connected with the two network conductors while the jar $a$ containing these bands may be made of aluminium and be connected to the ground.

Openings may be provided in the bands $e$ for facilitating the passage of the electrolyte and for increasing thereby also the conductivity between each band and the jar $a$.

In the second working example (Fig. 4) four rods $f$ are embedded within the central axis $c$ and are fastened to the same number of bands $e^1$, $e^2$, $e^3$ and $e^4$. Bands $e^1$, $e^3$ are connected to the network conductors and bands $e^2$, $e^4$ are connected to the ground.

If a three-phase network is to be dealt with, the form according to Fig. 5 may be chosen where six bands have been employed. Three bands $e^1$, $e^3$, $e^5$ are connected to the three wire-conductors, while the other bands are connected to the ground. There may also be employed only three bands which are all connected to the wire-conductors; in this case jar $a$ is made of aluminium and is connected to the earth.

As a matter of course the contrivances described in the above may be directly employed for electrolytic valves.

Having now fully described and ascertained the nature of my invention and in what manner it is to performed, I declare that what I claim is:—

1. In an electrolytic condenser or in an electrolytic valve where cylindrical armatures are wound around a central axis the combination with this axis made of insulating matter of rods of aluminium embedded therein unto each of which an armature like a band in shape of a circular evolute is fastened the number of rods corresponding to the number of armatures.

2. Electrolytic condenser or electrolytic valve where cylindrical armatures are wound around a central axis the combination with this axis made of insulating matter of rods of aluminium embedded therein unto each of which an armature like a band in shape of a circular evolute is fastened and the upper ends of which are serving as connecting contacts of the incoming and the outcoming current the number of rods corresponding to the number of armatures.

In testimony whereof I have affixed my signature in presence of two witnesses.

GEORGES GILES.

Witnesses:
DAVID MICHAEL AUHL,
ROD. DE WORSTEMBERG.